United States Patent [19]
Ycas

[11] Patent Number: 4,775,908
[45] Date of Patent: Oct. 4, 1988

[54] MOVING MAGNET ACTUATOR

[75] Inventor: John A. Ycas, Boulder, Colo.

[73] Assignee: MiniScribe Corporation, Longmont, Colo.

[21] Appl. No.: 42,281

[22] Filed: Apr. 24, 1987

[51] Int. Cl.[4] .......................... G11B 5/55; G11B 21/10
[52] U.S. Cl. ...................................................... 360/106
[58] Field of Search ........................................... 360/106

[56] References Cited

U.S. PATENT DOCUMENTS

| | | | |
|---|---|---|---|
| Re. 32,075 | 1/1986 | Harrison et al. | 360/106 |
| 4,064,545 | 12/1977 | Goss | 360/106 |
| 4,131,921 | 12/1978 | Gruczelak | 360/106 |
| 4,196,456 | 4/1980 | Manzke et al. | 360/106 |
| 4,300,176 | 11/1981 | Gilovich et al. | 360/106 |
| 4,331,991 | 5/1982 | Morehouse et al. | 360/106 |
| 4,490,635 | 12/1984 | Harrison et al. | 360/106 |
| 4,544,972 | 10/1985 | Kogure et al. | 360/106 |

Primary Examiner—Robert S. Tupper
Attorney, Agent, or Firm—Curtis, Morris & Safford

[57] ABSTRACT

A moving magnet rotary actuator is provided for use in a memory device of the type having a magnetic memory disk upon which data may be stored and read. The actuator includes a rotary body coupled to one or more elongated arms which support read/write transducer heads. A permanent magnet, driven by the magnetomotive forces which are generated by the energization of a stationary coil mounted opposite and adjacent to the magnet, is mounted on and moves with the body. Rotation of the body moves the heads from track to track on the magnetic memory disk. The direction of movement is determined by the polarity of the current through the coil; and the speed and distance of actuator travel is determined by the magnitude of the current.

24 Claims, 4 Drawing Sheets

MOVING MAGNET ACTUATOR

BACKGROUND OF THE INVENTION

This invention relates to a rotary actuator for positioning one or more magnetic heads in a disk drive assembly and more particularly to a moving magnet rotary actuator.

Magnetic disk drive units, used for example in computer systems, generally employ actuators which are either of the rotary or linear moving type. Rotary actuators move the head or heads of a read/write assembly in an arc to position a head at a desired track on a disk. Linear actuators, of course, move the heads in a straight line over the tracks of the disk.

Rotary actuators are generally comprised of a pivotable shaft, to which an arm or series of arms is connected to pivot in unison with the shaft. The arm or arms extend radially outward from the shaft to support the read/write heads at the free end thereof opposite the shaft. In one prior art embodiment, a coil is mounted either on the shaft or on the arm assembly (usually, at an end of the arm remote from the heads); and a permanent magnet is fixedly positioned near and usually located above and below each coil on the actuator assembly. Suitable drive and positioning circuitry is coupled to the coil to supply a drive current thereto. As the coil is energized, magnetomotive forces are generated between the coil and the magnet to drive the actuator and thereby position the heads at the desired track on the disk.

In another embodiment of the prior art, the coil comprises the armature of a squirrel cage motor arrangement, and is located at the base of the shaft. Permanent magnets surrounding the armature act therewith to drive the actuator assembly in an arcuate path.

In still other prior art arrangements, the read/write heads are mounted on support arms, as indicated above, and the arms are driven by a coil mounted to the arm assembly. In such an arrangement, fixed permanent magnets are located above and below the coil; and energization of the coil moves the arm and, thus, the heads.

Disadvantages are encountered in the prior art devices discussed above. Typically, those arrangements in which the coil is mounted on the arm of the head support assembly remote from the read/write heads are bulky and difficult to assemble and service. Furthermore, unwanted torque may be exerted on the shaft due to difficulty in properly balancing the head support assembly.

Moving coil actuators typically are referred to as voice coil actuators. In order to operate these actuators efficiently and with high speed, a large torque must be generated to overcome inertial forces acting on the head support assembly. To generate this large torque, large voice coils have been employed. As the size of the coil increases, proper balancing of the mechanical forces exerted on the shaft is more difficult to achieve. This, in turn, leads to increased wear on the shaft bearings. Wear on the bearings will affect both the accuracy and sensitivity of the track positioning ability of the device.

Disk drive assemblies normally are disposed in closed environments, i.e. sealed enclosures to eliminate dust and other particles from contaminating the disk surface. As a result, the useful life of the assembly has been prolonged. Less wear on the shaft bearings will, of course, reduce the possibility of shortening that useful life. In addition, size is an important factor, as smaller components inside the enclosure will accommodate additional disks, thereby increasing the storage capacity of the system. However, as stated, in order to effectively drive rotary coil actuators, the voice coil must be relatively large and this results in greater power requirements and the generation of more heat. The heating problem is addressed by heat conductive materials in the support, chassis and housing of the disk drive assembly. Also, moving coils exhibit less than favorable mechanical rigidity. Consequently, they are susceptible to vibration and instability during track seek as well as read/write operations. The moving coil actuator is also difficult to assemble, requiring precision in aligning the coil and the magnets so that the movement of the coil between the "sandwiching" magnets is uniform and unimpeded.

Another type of rotary actuator that has been proposed heretofore for magnetic disk drive units of the so-called Winchester type contemplates a stationary coil that is fixedly supported opposite a magnet mounted on the arm assembly. The latter is formed as a rotary body having one or more head-support arms extending outwardly from one end thereof with a magnet mount secured to an opposite end of the body. The magnet mount is formed of iron or other suitable magnetic material; and the coil is supported by a suitable structure of magnetic material. Opposite ends of the magnet are oppositely polarized (N) and (S), respectively, such that flux passes from, for example, the north pole, through a portion of the stationary coil, to the flux conductive coil support, along that support and through the coil to return to the south pole of the magnet. Since the coil support is fixed but the magnet moves, the flux conducting path may be thought of as being fixed because it is substantially defined by the fixed support.

One disadvantage of using a fixed flux conducting path of the aforementioned type is the occurrence of "side pull" forces on the shaft about which the actuator body rotates. That is, since the magnetic flux crosses the gap between the magnet and the coil, a lateral force is exerted on the magnet which tends to pull the body laterally. No oppositely-directed force is exerted on the magnet and, thus, the side pull force is not balanced.

Another disadvantage of using a fixed flux conducting path is the occurrence of a bias force which acts as a component of the rotary force exerted on the body. This bias force is present when the body is rotatably driven as well as when the body is stationary. Thus, when a particular track has information written onto or read from it, thus requiring the body to remain still, the bias force tends to move the body, and thus the read/write head, resulting in a tracking error. Such bias forces must be balanced.

OBJECTS OF THE INVENTION

Therefore, it is an object of the present invention to provide a rotary actuator for use in a magnetic disk memory device which avoids the aforementioned disadvantages of the prior art.

Another object of this invention is to provide a rotary actuator upon which is mounted a permanent magnet which, in cooperation with a stationary coil, serves to drive the actuator when the coil is energized.

A further object of the invention is to provide a rotary actuator which is properly balanced by mounting a permanent magnet on the actuator assembly to balance the head support arm thereof.

Another object of this invention is to provide a balanced rotary actuator in which unwanted torque about the shaft axis is reduced or effectively eliminated, thereby improving the accuracy and sensitivity with which the heads are positioned on a track.

An additional object of the invention is to provide a rotary actuator which is properly balanced to greatly reduce or effectively eliminate wear on the bearings of the actuator shaft.

Still another object of this invention is to provide a rotary actuator which is smaller in dimension and uses lesser amounts of power to operate.

Yet another object of this invention is to provide a rotary actuator which is relatively easy to assemble.

A further object of this invention is to provide a moving magnet rotary actuator which avoids side pull forces on the actuator shaft and bearings.

An additional object of this invention is to provide a moving magnet rotary actuator which minimizes the heating problems attending prior art actuators.

Various other objects, advantages and features of the present invention will become readily apparent from the ensuing detailed description, and the novel features will be particularly pointed out in the appended claims.

SUMMARY OF THE INVENTION

In accordance with the present invention, rotary head support apparatus is provided for use in a magnetic disk memory device. The apparatus includes a rotary body to which magnetic read/write heads are coupled. At least one permanent magnet is mounted on and movable with the rotary body and a stationary coil is mounted opposite the magnet and is spaced therefrom by a gap. When the coil is energized, the resultant magnetomotive forces tend to move the magnet, thereby moving the body. In a preferred embodiment, the body rotates about a fixed shaft.

In accordance with one aspect of this invention, a magnetic flux return path is provided to return flux which passes from the movable magnet to the fixed coil back to the magnet. In one embodiment, the flux return path comprises a flux conductor mounted on and movable with the body and having a first portion in magnetic contact with the magnet; a second portion spaced from that first portion and having the fixed coil interposed between the first and second portions, and a third portion linking the first and second portions. In this embodiment, the coil is mounted on a coil support which, preferably is formed of non-magnetic material and functions as a heat sink.

In accordance with another embodiment of this invention, the flux return path is comprised of a fixed flux conductor having a coil mounting portion to which the fixed coil is mounted, a flux return portion for returning flux to the magnet at a location remote from the magnet/coil gap, and a further portion which links the coil mounting portion and the flux return portion. In this embodiment, the flux conductor is substantially C-shaped to circumscribe at least a portion of the magnet. As one aspect of this embodiment, the magnet is mounted to the body by means of a flux conducting magnet mount having flanges adjacent the free ends of the C-shaped flux conductor. Flux thus passes from the magnet through the coil to the flux conductor, thence to the free ends of the flux conductor, and from there through the flanges of the magnet mount back to the magnet.

In both embodiments, side pull forces which might otherwise be exerted between the magnet and the coil support are cancelled, thereby obviating deleterious side pulls on the shaft about which the body rotates.

As aforesaid, in one embodiment the flux conductor is mounted on and movable with the body; and in another embodiment the flux conductor is fixed. In both embodiments, the flux conductor is bifurcated and the fixed coil is interposed between the bifurcated portions.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
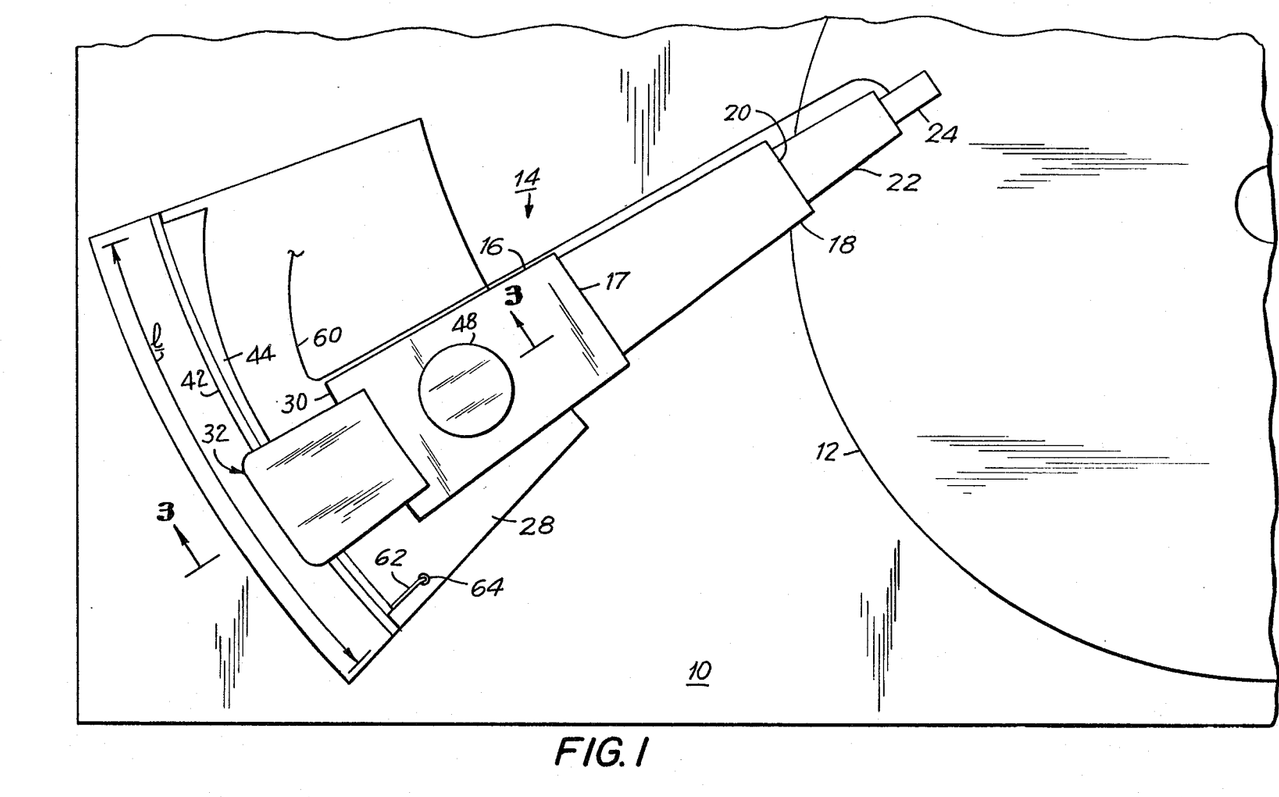
FIG. 1 is a top view of a preferred embodiment of the moving magnet rotary actuator in accordance with the present invention.
Figure 2:
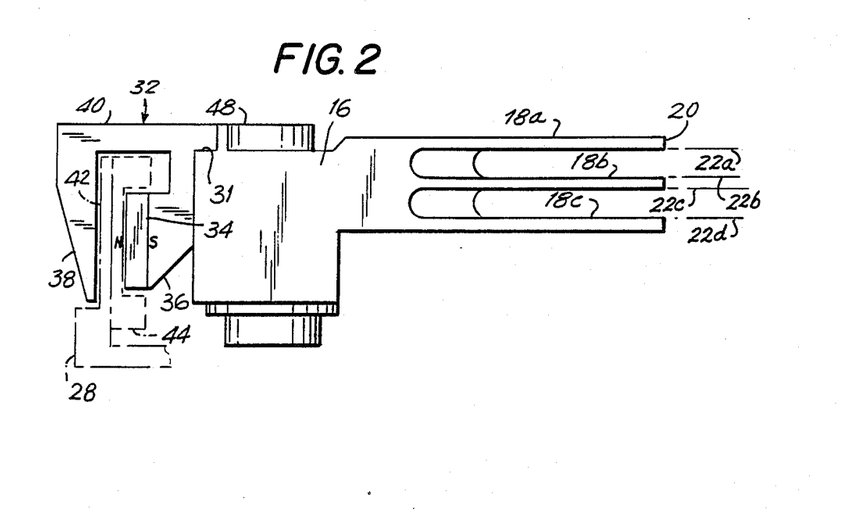
FIG. 2 is a side view of the moving magnet rotary actuator shown in FIG. 1.
Figure 3:
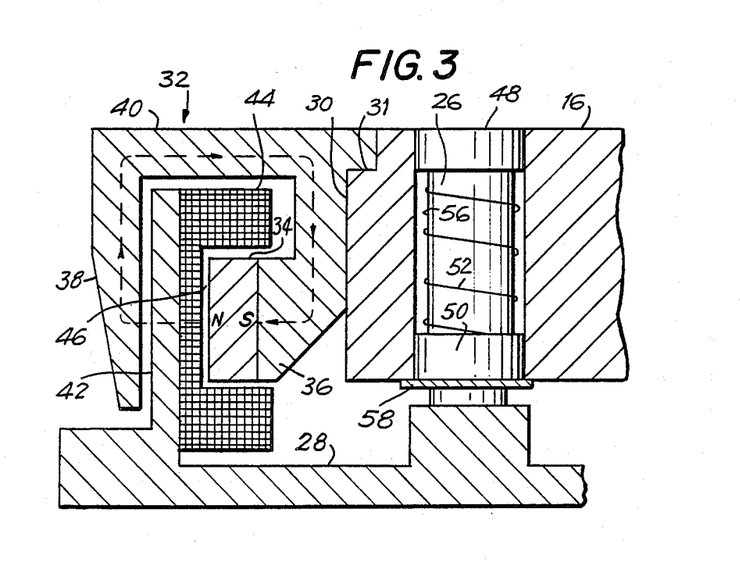
FIG. 3 is a sectional view of a portion of the moving magnet actuator taken along lines 3—3 in FIG. 1.

Referring now to the drawings, wherein like reference numerals are used throughout, and in particular to FIGS. 1-3, there is illustrated a preferred embodiment of a moving magnet rotary actuator in accordance with the present invention. This moving magnet rotary actuator is used to position one or more transducers, referred to simply as magnetic read/write heads, at desired tracks provided on respective surfaces of one or more magnetic disks. In this regard, the present invention is shown in the environment of a magnetic disk memory device 10 having a stack of magnetic disks 12 (only one of which is shown in FIG. 1), the magnetic disk memory device further including rotary actuator 14. Although the present invention is described in the environment of a magnetic disk memory device, known to the art a a Winchester disk drive, it will be appreciated that the teachings of the present invention are equally applicable to other data storage devices in which information is written onto or read from a storage medium. For example, the rotary actuator of this invention can be used to position a read and/or write head relative to an optical disk, a laser disk, or the like. For simplification, the following description is set out in the environment of a Winchester disk drive device.

Rotary actuator 14 is comprised of a body 16, preferably formed of non-magnetic material, such as aluminum, having one or more elongated arms 18 extending from a forward end 17 thereof (preferably, a plurality of arms 18 extend from body 16), each arm serving to support at least one read/write head 24. As shown in FIG. 1, head 24 is suspended from a head support flexure 22, this flexure being mechanically coupled to distal end 20 of arm 18. Flexure 22 forms no part of the present invention per se, and one embodiment thereof may be of the type described in copending application Ser. No. 765,713, filed Aug. 14, 1985. In the embodiment shown in FIG. 2, body 16 may be provided with plural arms 18a, 18b and 18c, and the body and arms may be of unitary construction. Alternatively, arms 18a–18c may be mechanically coupled to body 16. As also shown in FIG. 2, flexure 22a is mechanically coupled to and extends outwardly from arm 18a, flexures 22b and 22c are mechanically coupled to and extend outwardly from arm 18b and flexure 22d is mechanically coupled to and extends outwardly from arm 18c. In the embodiment shown in FIG. 2, four flexures and, thus, four heads are provided. Consequently, data may be read from or written onto four separate surfaces of magnetic disks 12 and, thus, two magnetic disks may be incorporated into the disk drive device. It will be appreciated that a greater or lesser number of disks may be used, thus requiring a greater or lesser number of arms 18 for supporting a concomitant number of heads 24.

Body 16 is journalled for rotation about a fixed shaft 26, the shaft being supported on a mounting plate 28 (FIG. 3). Alternatively, body 16 may be fixedly mounted to a rotary shaft such that, as the shaft rotates, the body and, thus, arms 18 rotate. In the embodiment described herein, however, shaft 26 is stationary and body 16, together with arms 18, rotate thereabout.

A flux conducting structure 32 is mechanically coupled to body 16 at rearward end 30 of the body. As shown more particularly in FIGS. 2 and 3, the top surface of body 16 is provided with a mounting recess 31 in the vicinity of its rearward end 30, and flux conducting structure 32 is seated in this recess. Preferably, screws may be used to attach flux conducting structure 32 to body 16. Alternatively, other conventional fastening means, such as a suitable cement, may be used. In any event, it will be appreciated that the flux conducting structure moves with the rotary movement of body 16.

A magnet 34, best seen in FIGS. 2 and 3, is secured, as by a suitable adhesive, to a magnet mount portion 36 of flux conducting structure 32. The particular materials of which magnet 34 is formed form no part of the present invention per se; but in one embodiment, the magnet is formed of rare earth magnetic material, such as that commercially marketed by TDK. The magnet is polarized across its surfaces such that one polarized surface is in contact with the mounting surface of magnet mount portion 36 and, of course, the other polarized surface is exposed and, as will be described, is adapted to interact with a coil 44. By securing magnet 34 to the magnet mount portion of flux conducting structure 32, and by coupling the flux conducting structure to body 16, as shown herein, it is appreciated that magnet 34 moves with the body and, thus, rotates about shaft 26.

Before describing flux conducting structure 32 further, reference is made to coil 44. As seen in FIG. 3, this coil exhibits a substantially C-shape, in section, and is supported on a coil support portion 42 of mounting plate 28. Since the mounting plate and, thus, coil support portion 42 thereof is formed of non-magnetic material, such as aluminum, no influence is exerted thereby over the magnetic flux generated by permanent magnet 34. Moreover, coil support portion 42 together with the remainder of mounting plate 28 functions as a heat sink to distribute and dissipate heat generated by electrical energization of coil 44. Hence, the difficulties attributed to localized heating, such as a change in the resistance characteristics of the windings constituting coil 44, heretofore present in prior art actuators, are reduced. Consequently, the servo operation used to drive the actuator (and also to maintain the actuator in a fixed position during read/write operations onto a track) is simplified. Moreover, since heat generated by coil 44 now is distributed and then dissipated, mechanical failures due to localized heating are obviated.

From FIG. 1, it is seen that actuator 14 is adapted to rotate about shaft 26, resulting in an arcuate movement of flux conducting structure 32 and, thus, permanent magnet 34. Of course, the direction and speed of movement of actuator 14 is dependent upon the polarity and magnitude of the current with which coil 44 is energized. Nevertheless, to accommodate this arcuate movement of the flux conducting structure and magnet, coil support portion 42 of mounting plate 28 is shaped in an arc, as illustrated. Likewise, coil 44, although exhibiting a C-shaped section, is formed as an arc. By providing these arcuate shapes, a constant spacing, or gap 46, is maintained between the exposed surface of magnet 34 and the facing surface of coil 44, shown in FIG. 3.

Figure 4:
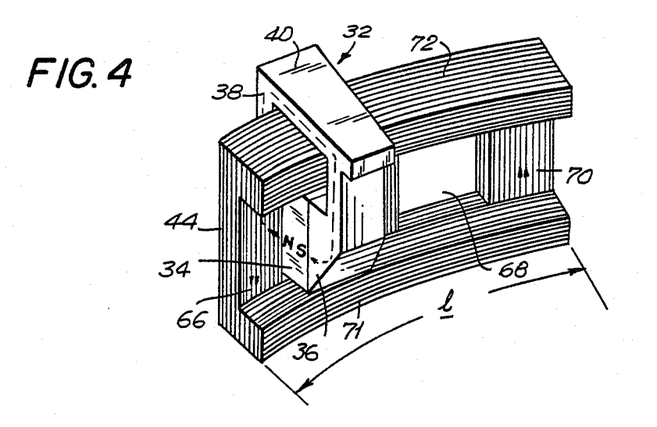
FIG. 4 is a perspective view of the magnetic drive portion of the rotary actuator shown in FIGS. 1-3.

It is appreciated that coil 44 is formed of multiple turns, and this is best illustrated in FIG. 4. Since body 16 and, thus, flux conducting structure 32 do not move over the entire extent, or length 1, of coil 44, it is appreciated that only a portion of the overall length of the coil is used to interact with magnet 34 for driving the magnet. Thus, coil 44 may be thought of as being divided into two separate portions, referred to herein as an actuator drive portion 66 (FIG. 4) and a current return portion 70. Actuator portion 66 subtends the range of travel of magnet 34. It will be recognized that uniform spacing between the exposed surface of magnet 34 and the surface of coil 44 need be maintained substantially only in the actuator drive portion. The large number of windings provided in the magnetic field between magnet 34 and flux conducting extension 38 advantageously obviates or at least mitigates any effects that otherwise would be attributed to a difference in wire thickness or non-uniformity of the turns comprising the coil.

As best shown in FIG. 4, actuator drive portion 66 and return portion 70 are separated by an opening 68 formed by the turns of coil 44. A typical turn may be formed by one leg of that turn included in actuator drive portion 66, another leg of that turn extending along bottom section 71 to yet another leg included in return portion 70, and then a final leg provided from return portion 70 to actuator drive portion 66 along section 72. In this manner, if direct current is supplied to coil 44, current may be thought of as flowing in the downward direction through each turn included in actuator drive portion 66 and upward through each turn included in return portion 70. As those of ordinary skill in the art will appreciate, current flowing in this direction through each turn included in actuator drive portion 66 imparts a clockwise force on magnet 34 (as viewed in FIG. 1), thereby driving actuator 14 in the clockwise direction about shaft 26. If the polarity of the current flowing through coil 44 is reversed, current may be thought of as flowing in the upward direction through each turn of actuator drive portion 66, thereby imparting a counterclockwise force on magnet 34. As a result, actuator 14 is driven in the counterclockwise direction about shaft 26.

For convenience, the thickness of return portion 70 need not be substantially constant as is the thickness of actuator drive portion 66. This is because uniform spacing between return portion 70 and magnet 34 is not necessary, since the magnet will be not driven to a position opposite return portion 70.

Returning now to the description of flux conducting structure 32, this structure is formed as a bifurcated structure having magnet mount portion 36, as mentioned above, and a flux conducting extension 38, best shown in FIGS. 2 and 3. Flux conducting extension 38 is physically coupled to magnet mount portion 36 by means of a flux return portion 40. These three portions 36, 38 and 40 are of integral construction and are formed of magnetic material so as to form a flux conducting path, to be described.

It will be seen that flux conducting extension 38 extends as a downward finger behind coil support portion 42 of mounting plate 28. As a result of this construction, coil 44 is interposed between magnet mount portion 36 and flux conducting extension 38. Flux return portion 40 is seen to overlie the coil, thereby permitting free and unobstructed movement of the entire flux conducting structure 32 relative to stationary coil 44, while maintaining a constant flux path from magnet 34 through coil 44, as will be described. It will be recognized further that coil support portion 42 may be thought of as having two sides, or surfaces, one side supporting coil 44 opposite a polarized surface of magnet 34 and spaced from the magnet across gap 46, and the other side being opposite and spaced from flux conducting extension 38.

When viewed from above, as shown in FIG. 1, flux conducting structure 32 is substantially fan-shaped. This provides uniform flux from magnet 34 through coil 44.

From FIG. 3, it is seen that shaft 26 passes through a bore 56 in body 16 and is supported on mounting plate 28. Top and bottom bearings 48 and 50, respectively, are urged apart by means of a bearing pre-load spring 52. Bearings 48 and 50 are secured to body 16 and permit the body to rotate thereby about fixed shaft 26. Preferably, a shoulder 58 is provided at the bottom of body 16.

As also shown in FIG. 1, a read/write data lead 60 extends from data processing circuitry (not shown) to head(s) 24. Coil energizing conductors 62 are coupled to coil 44 and pass through an aperture 64 in mounting plate 28 to be coupled to suitable coil driving circuitry (not shown). By physically separating data lead 60 from coil energizing conductors 62, noise or cross-talk that might be superimposed onto the data lead from the coil energizing leads is avoided. Such cross-talk problem is susceptible in prior art actuators in which the data and coil energizing leads are "bundled".

In operation, it is appreciated that magnetic flux from one polarized surface of magnet 34, such as the north pole face thereof, extends across gap 46 and through actuator drive portion 66 of coil 44. The flux continues to flux conducting extension 38 and then is directed through flux return portion 40 to magnet mount portion 36 of flux conducting structure 32. Thence, the closed flux path returns the flux to the south pole face of magnet 34, this face being in intimate contact with magnet mount portion 36. Current flowing in one direction through the turns included in actuator drive portion 66 of coil 44 results in a magnetomotive force exerted on the magnet in a direction to move the magnet in the clockwise or counterclockwise direction, relative to shaft 26. Since the magnet is mechanically coupled to body 16, and since the body is free to rotate, or pivot, about the shaft, this magnetomotive force drives the body about the shaft, thereby moving head(s) 24 from one track to another. A reversal in the direction of current flowing through actuator drive portion 66 results in a reversal in the pivoting of the body. Hence, the direction of movement of actuator 14 is dependent upon the polarity of the current supplied to coil 44 (which, as mentioned above, is a direct current), and the speed of movement of the actuator is dependent upon the strength of the magnetomotive force exerted on magnet 34 which, in turn, is dependent upon the magnitude of the coil-energizing current.

It now is readily apparent that flux conducting structure 32 moves with the rotary movement of body 16. Since the flux conducting path moves with magnet 34, the orientation of that path with respect to the magnet is constant. This differs from prior art attempts wherein the flux conducting path was fixed, notwithstanding movement of the magnet. A disadvantage associated with such a fixed (as opposed to a moving) flux conducting path relates to a change in the orientation of that path relative to the magnet as the magnet moves. That is, the moving magnet relative to the fixed flux conducting path results in a changing flux path orientation. This, in turn, produces bias forces that tend to rotate the actuator about shaft 26. Because of these bias forces, if the actuator is moved to a desired track on disk(s) 12, such bias forces must be compensated or balanced to prevent undesired, small movemente of the actuator during a read/write operation. If these bias forces are not compensated or balanced, head(s) 24 moves relative to the desired track, thereby affecting deleteriously the data read from or written onto that track. Such small, undesired movements of the actuator do not occur in the embodiment shown in FIGS. 1–4. This is achieved primarily because flux passes across gap 46 in only one direction and does not return to magnet 34 by traversing this gap again.

Preferably, flux conducting structure 32 and magnet 34 are mounted on body 16 to extend oppositely from arm(s) 18. This arrangement tends to balance the moment forces acting on the body and, as a result, lateral torque on shaft 26 is eliminated or at least substantially reduced. Hence, bearings 48 and 50 are subjected to reduced wear; and the accuracy and sensitivity of track positioning remains constant over extended use of disk drive 10.

Figure 5:
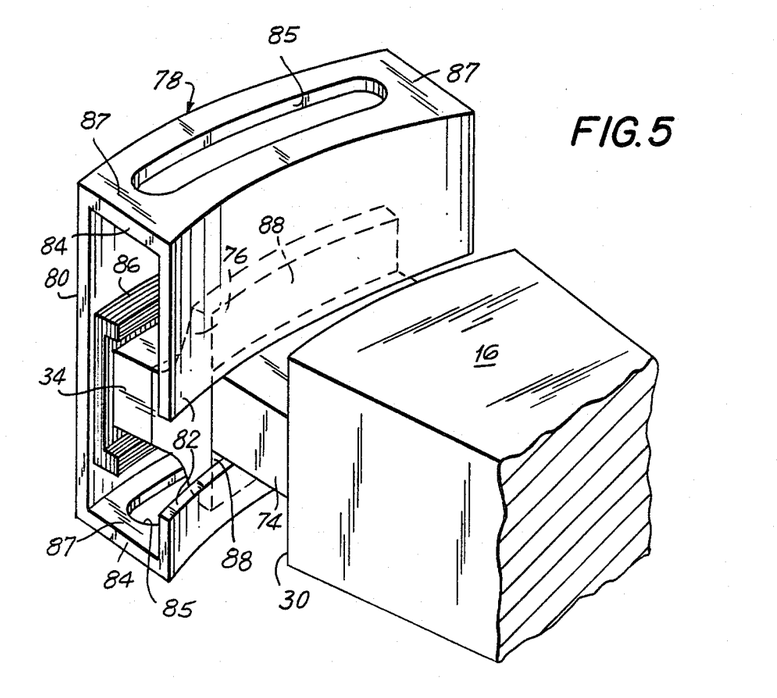
FIG. 5 is a perspective view of another embodiment of the magnetic drive portion of the rotary actuator in accordance with the teachings of the present invention.
Figure 6:
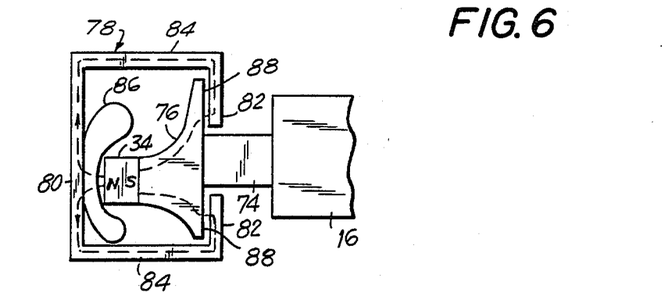
FIG. 6 is a side view of the structure shown in FIG. 5.

Another embodiment of the magnetic drive portion of actuator 14 is illustrated in FIGS. 5 and 6. This embodiment differs from that described hereinabove primarily in that the flux conducting structure in this embodiment is fixed and does not move with rotary movement of magnet 34. In the embodiment now described, a suitable magnet support 74 extends from rearward end 30 of body 16, thereby providing a balance to arm(s) 18 which extends from forward end 17 of the body. Magnet support 74 terminates in a magnet mount 76 which, as illustrated, is substantially T-shaped, the cross-piece of the T being secured to support 74 by suitable means, such as cement or other fastening devices. Magnet 34, which may be the same as the magnet described above, is secured to magnet mount 76.

In the embodiment shown in FIGS. 5 and 6, a flux conducting structure 78 is fixedly secured to a mounting plate (not shown), such as mounting plate 28, or to any other suitable portion of the chassis of the disk drive (also not shown). The flux conducting structure, when viewed from the side, is seen to be substantially C-shaped and includes a central coil mounting portion 80, two equal but opposite flux returning portions 82, each flux returning portion being integrally connected to coil mounting portion 80 by respective flux path portions 84. Preferably, flux path portions are provided with openings or slots 85 for a purpose to be described. The combination of each flux return portion 82 and its flux path portion 84 constitutes a respective leg of the C-shaped flux conducting structure 78. The coil 86, which may be similar to aforedescribed coil 44, is mounted on coil mounting portion 80 by a suitable cement. Here too, a sectional view of coil 86 is substantially C-shaped; although a modification of this shape may be used, if desired, as depicted in FIG. 6.

The cross-piece of the T-shaped magnet mount 76 constitutes a pair of flanges 88, each flange being spaced from and opposite a respective flux return portion 82 of flux conducting structure 78.

Although not shown in FIG. 5, it will be appreciated that, as body 16 pivots about its shaft (not shown), magnet 76 is driven along an arcuate path. When viewed from above, flux conducting structure 78 and coil 86 preferably exhibit an arcuate shape substantially coaxial with the arcuate movement of magnet 34. Such arcuate shape thus maintains a substantially constant gap between the exposed polarized face of magnet 34 and coil 86.

In operation, it is seen that flux from one polarized face of magnet 34, such as the north face, crosses the gap between the magnet and coil 86, passes through the coil to coil mounting portion 80 of flux conducting structure 78, and then diverges along two substantially equal paths. One path includes the top flux path portion 84 to flux return portion 82, and the other path includes the bottom flux path portion 84 to flux return portion 82. From there, flux traverses a second gap between each flux path portion 82 and a respective flange 88 of magnet mount 76, to return to the south pole of magnet 34.

Although flux conducting structure 78 in the embodiment of FIGS. 5 and 6 is fixed and does not move with magnet 34 as in the embodiment of FIGS. 1–4, the aforementioned disadvantage of bias forces that had been produced in prior art attempts which relied upon a fixed flux conducting path does not occur. Bias forces are produced when the flux conducting path, and particularly the flux return path, has lower magnetic permeance on one side than on the other. By removing material from the center sections of flux return portions 84 to form slots 85, the flux return path is divided into two separate paths; one on the left side and one on the right side of slots 85 and also of magnet 34 (as viewed in FIG. 5). Each of these separate paths includes relatively thin sections 87 which are at or close to magnetic saturation. Irrespective of the position of magnet 34 in the vicinity of either side or in the middle of flux conducting structure 78, the return flux passes equally through the return paths formed of thin sections 87 and flux return portions 82. For example, if more flux is applied to one return path than the other, such as because of the position of magnet 34, the flux density would tend to increase in that path. However, since the flux density through each path is at or close to saturation, the resistance to flux passage in that path increases and the flux is forced to return via the other path, thereby equalizing the bias forces.

The phenomenon of side pull forces now will be described. A side pull force is a magnetic attractive force that is generated between, for example, magnet 34 and flux conducting structure 32 or flux conducting structure 78. In the embodiment shown in FIGS. 1–4, this attractive force tends to attract flux conducting extension 38 to magnet 34. However, since the magnet and flux conducting extension are mounted on the very same flux conducting structure 32, such magnetic attractive force does not impart side pull forces on body 16.

However, in the embodiment shown in FIGS. 5 and 6, since flux conducting structure 78 is fixed, the magnetic attractive force between magnet 34 and coil mounting portion 80 would tend to urge body 16 toward the coil mounting portion, thus constituting the aforementioned side pull force on the body. But, flux return portions 82 of the flux conducting structure tend to exert magnetic attractive forces on flanges 88. These magnetic attractive forces are substantially equal and opposite to the magnetic attractive forces exerted between magnet 34 and coil mounting portion 80. Hence, the side pull force that is produced between the magnet and coil mounting portion 80 is balanced by the equal and opposite side pull force exerted between flux return portions 82 and flanges 88. Since these side pull forces are balanced, no resultant side pull force is exerted on body 16.

Figure 7:
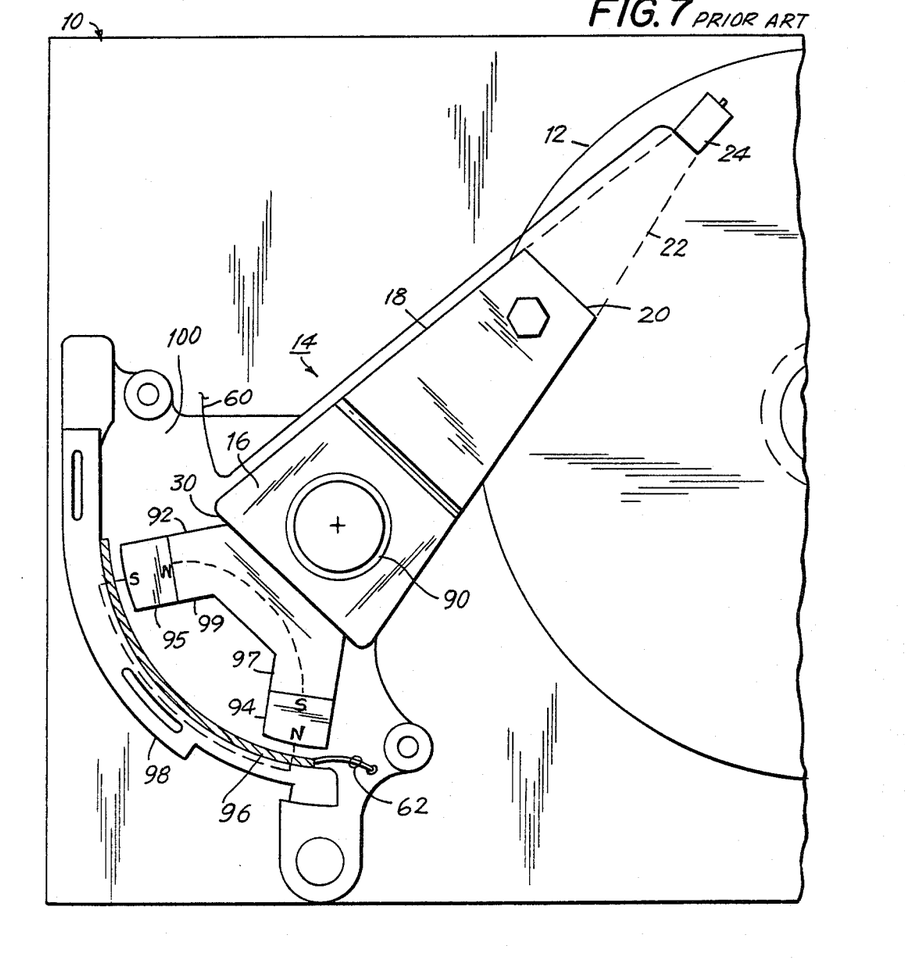
FIG. 7 is a top view of a prior art moving magnet rotary actuator.

The advantages achieved by the present invention will best be appreciated by comparing the embodiments shown in FIGS. 1–6 to a prior art embodiment shown in FIG. 7. This prior art construction is largely hypothetical and, for the purpose of the present discussion is drawn as a close analogy to the inventive embodiments described above. Accordingly, in FIG. 7 rotary actuator 14 is provided with a body 16 having one or more elongated arms 18 extending therefrom similar to that shown in FIG. 1. Body 16 may be journalled for rotation about a fixed shaft or, alternatively, and as shown in FIG. 7, the body may be secured to a rotary shaft 90 which, in turn, is provided with suitable bearings in a shaft support (not shown) of a mounting plate 100. A simple Y-shaped magnet mount 92 extends from rearward end 30 of body 16; and a pair of permanent magnets 94 and 95 are secured to respective arms 97 and 99 of this magnet mount. It is assumed that the mass of the magnet and magnet mount tend to balance the mass of arm(s) 18, flexure(s) 22 and head(s) 24.

In the prior art depiction shown in FIG. 7, opposite ends of magnet 94 are oppositely polarized, and, likewise the opposite ends of magnet 95 are oppositely polarized, as illustrated. These magnets are spaced from a stationary coil 96 which, in turn, is mounted on a coil support 98 formed of, for example, iron or other magnetic materials. Coil support 98 extends upwardly from mounting plate 100 and may be secured to the mounting plate or, alternatively, may be integrally formed therewith.

In the illustrated prior art depiction, flux extends from the north pole end of magnet 94 across the gap between the magnet and coil 96 to coil support 98. Flux then passes through the coil support and then traverses the gap once again to the south pole end of magnet 95 from which the flux completes its loop to the north pole of magnet 95 and then through magnet mount 92 to the south pole of magnet 94. Thus, as shown, the magnetic flux traverses the same gap (i.e. the gap between the magnets and the coil) twice: once from the north pole of magnet 94 to the coil support and once from the coil support to the south pole of magnet 95. As a result, magnetic attractive forces are exerted between magnets 94 and 95 and coil support 98. These attractive forces result in a side pull force on body 16, and this side pull force is presented as a side loading force on shaft 90. Whereas the magnetic attractive force between magnets 94 and 95 and coil support 98 is not compensated or balanced, thereby resulting in the aforementioned side pull forces, the embodiment shown in FIGS. 5 and 6 advantageously provides compensation for this magnetic attractive force. In the embodiment of FIGS. 1-4, the magnetic attractive force between magnet 34 and flux conducting structure 32 does not result in any side pull force exerted on body 16 or on any side loading force exerted on shaft 26.

While the present invention has been particularly shown and described with reference to preferred embodiments, it will be readily apparent to those of ordinary skill in the art that various changes and modifications may be made without departing from the spirit and scope of the invention. For example, magnet 34 may be formed as a single magnet (as shown in FIGS. 1-6) or, alternatively, a plurality of magnets, stacked one above the other, having the polarized faces shown in FIGS. 2-6, may be used. Such additional magnets may be used with a single coil 44 (or 86); or additional coils may be provided, each additional coil being juxtaposed a respective one of the stacked magnets.

It is intended that the appended claims be interpreted as including the foregoing as well as various other changes and modifications.

What is claimed is:

1. Rotary head support apparatus for use in a magnetic disk memory device, said apparatus comprising a rotary body, means for coupling at least one head to said rotary body, at least one permanent magnet mounted on and movable with said rotary body, a stationary coil mounted opposite said permanent magnet and spaced therefrom by a gap, said coil being energizable to rotatably drive said rotary body by exerting magnetomotive forces thereon, and means for providing a magnetic flux return path to said magnet, which return path does not pass through said gap.

2. Apparatus of claim 1 further comprising a shaft, bearing means for coupling said body to said shaft, and means for supporting said shaft.

3. Apparatus of claim 2 wherein said means coupling at least one head to said rotary body comprises at least one elongated arm coupled to said body for supporting said head, said arm extending from said body in one direction, and said apparatus further including means for mounting said permanent magnet to said body to extend oppositely from said arm.

4. Apparatus of claim 3 wherein said means for mounting said permanent magnet to said body comprises magnet mount means extending from said body in a direction opposite from said arm for receiving said permanent magnet, such that said permanent magnet tends to balance said arm and reduce lateral torque on said shaft.

5. Apparatus of claim 2 wherein said shaft is fixed and said bearing means enables said body to rotate about said fixed shaft.

6. Apparatus of claim 1 wherein said means for providing a flux return path comprises fixed flux conducting means having a coil mounting portion to which said coil is mounted, a flux return portion for returning flux to said magnet at a location remote from said gap, and a flux path portion linking said coil mounting portion and said flux return portion.

7. Apparatus of claim 6 further comprising flux conducting magnet mount means coupled to said body for receiving and disposing said magnet across a gap from the coil mounting portion of said fixed flux conducting means, said flux return portion of said flux conducting means being adjacent said magnet mount means to return flux thereto.

8. Apparatus of claim 7 wherein said fixed flux conducting means is C-shaped, the flux return portion comprising the free ends of the C-shape, and said magnet mount means having flanges disposed adjacent said free ends.

9. Apparatus of claim 7 wherein said magnet mount means is disposed between said coil mounting portion and said flux return portion of said fixed flux conducting means such that a side pull force exerted between said magnet and said coil mounting portion is opposite a side pull force exerted between said magnet mount means and said flux return portion.

10. Apparatus of claim 1 wherein said means for providing a flux return path comprises flux conducting means mounted on and movable with said body and having a first portion in magnetic contact with said magnet, a second portion spaced from said first portion and having said stationary coil interposed between said first and second portions, and a third portion linking said first and second portions.

11. Apparatus of claim 10 wherein said flux conducting means is mounted on and movable with said rotary body, and said first portion receives said magnet and disposes same opposite said coil and across said gap.

12. Apparatus of claim 11 further comprising coil support means having first and second sides, one side of said coil support means supporting said coil across said gap from said magnet and said second side of said coil support means being opposite said second portion of said flux conducting means.

13. Apparatus of claim 12 wherein said coil support means is formed of nonmagnetic material and functions as a heat sink for said coil.

14. Apparatus of claim 12 wherein said coil support means is arcuate-shaped to maintain a substantially constant gap between said coil and said magnet as said body rotates, and wherein said flux conducting means when viewed from a top view thereof is substantially fan-shaped.

15. Apparatus of claim 12 wherein said third portion of said flux conducting means overlies said coil and said coil support means.

16. Apparatus of claim 12 herein said coil when viewed from a sectional view thereof is substantially C-shaped having opposite ends which respectively overlie and underlie said magnet.

17. A rotary actuator for use in a magnetic memory apparatus of the type having a magnetic memory disk, the actuator comprising a rotary body, a plurality of arms secured to said body, at least one transducer head coupled to each of said arms for reading and writing data, at least one permanent magnet coupled to said body for generating magnetic flux, a stationary coil mounted across a gap from and opposite said at least one magnet for exerting a magnetomotive force on said magnet to rotate said body when said coil is energized; and flux path means for providing a path for said magnetic flux to cross said gap only once.

18. Apparatus of claim 17 wherein said arms are disposed in respective parallel planes.

19. Apparatus of claim 17 wherein said arms are elongated having first and second ends and wherein at least one transducer head is mounted at said first end of an arm and said at least one permanent magnet is coupled to said body diametrically opposite said transducer head.

20. Apparatus of claim 17 wherein said permanent magnet and said coil have concentric arcuate surfaces, whereby said gap remains constant during the arcuate movement of said magnet.

21. Apparatus of claim 20 further comprising a magnet mounting member secured to said body for receiving said magnet.

22. Apparatus of claim 21 wherein said magnet mounting member is formed of magnetic material for conducting flux therethrough and includes an integral extension which is disposed behind said coil such that said coil is interposed between said magnet and said extension and flux follows a path from said magnet to said gap, through said coil and thence to said extension and returned through said magnet mounting member to said magnet.

23. Apparatus of claim 22 further comprising a coil support formed of non-magnetic material for fixedly disposing said coil opposite said magnet and for functioning as a heat sink for said coil.

24. Apparatus of claim 17 wherein said shaft is rigidly fixed and said body pivots about said shaft.

* * * * *

UNITED STATES PATENT AND TRADEMARK OFFICE
CERTIFICATE OF CORRECTION

PATENT NO. : 4,775,908

DATED : October 4, 1988

INVENTOR(S) : John A. Ycas and David E. Norton, JR.

It is certified that error appears in the above-identified patent and that said Letters Patent is hereby corrected as shown below:

On the cover sheet, Item [75], should read --John A. Ycas and
David E. Norton, Jr, both of Boulder, Colo.--
Item 19, "Ycas" to read --Ycas et al.--

Signed and Sealed this

Eighteenth Day of April, 1989

Attest:

DONALD J. QUIGG

*Attesting Officer*   *Commissioner of Patents and Trademarks*